United States Patent
Chino et al.

(10) Patent No.: US 11,945,509 B2
(45) Date of Patent: Apr. 2, 2024

(54) VEHICLE BODY REAR PART STRUCTURE

(71) Applicant: HONDA MOTOR CO., LTD., Tokyo (JP)

(72) Inventors: Shungo Chino, Tokyo (JP); Yuya Akaba, Tokyo (JP); Toshihiro Yamaguchi, Tokyo (JP); Kyosuke Yamakita, Tokyo (JP); Yusuke Miura, Tokyo (JP); Dai Kamata, Tokyo (JP); Chihiro Sakagami, Tokyo (JP); Kosuke Fushimi, Tokyo (JP); Shohei Ohtsuka, Haga-gun (JP); Hitomi Yamada, Haga-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

(21) Appl. No.: 17/584,424

(22) Filed: Jan. 26, 2022

(65) Prior Publication Data
US 2022/0258808 A1 Aug. 18, 2022

(30) Foreign Application Priority Data
Feb. 12, 2021 (JP) .................................. 2021-021043

(51) Int. Cl.
*B62D 25/08* (2006.01)
*B62D 21/15* (2006.01)

(52) U.S. Cl.
CPC ............ *B62D 25/08* (2013.01); *B62D 21/152* (2013.01); *B62D 21/155* (2013.01); *B62D 25/087* (2013.01)

(58) Field of Classification Search
CPC .... B62D 25/08; B62D 21/152; B62D 25/087; B62D 21/155

USPC ....................................................... 296/146.2
See application file for complete search history.

(56) References Cited

U.S. PATENT DOCUMENTS

| 7,784,858 B2 * | 8/2010 | Abe ...................... B62D 25/087 |
| | | 296/187.11 |
| 9,963,169 B2 * | 5/2018 | Higuchi ............... B62D 27/023 |
| 2019/0061507 A1 * | 2/2019 | Nitta ....................... B60L 50/66 |

FOREIGN PATENT DOCUMENTS

| JP | 06-027439 | 4/1994 |
| JP | 11-171048 | 6/1999 |
| JP | 2003-312534 | 11/2003 |
| JP | 2016-199187 | 12/2016 |
| JP | 2017-043158 | 3/2017 |
| JP | 6098622 | 3/2017 |

(Continued)

OTHER PUBLICATIONS

Japanese Notice of Allowance for Japanese Patent Application No. 2021-021043 dated Oct. 4, 2022.

*Primary Examiner* — Amy R Weisberg
*Assistant Examiner* — Dana D Ivey
(74) *Attorney, Agent, or Firm* — Amin, Turocy & Watson, LLP

(57) ABSTRACT

A vehicle body rear part structure includes a rear frame and a beam member. The rear frame has: a first inner bead, a first outer bead, a second inner bead, and a second outer bead. The first inner bead and the first outer bead are formed on an inner wall and an outer wall, respectively, in a region close to the beam member. The second inner bead and the second outer bead are formed on the inner wall and the outer wall, respectively, in a region that is separated to a vehicle body frontward direction from the first beads. The first outer bead is formed to have a higher fragility than the first inner bead.

9 Claims, 12 Drawing Sheets

(56) References Cited

FOREIGN PATENT DOCUMENTS

| | | |
|---|---|---|
| JP | 2018-039312 | 3/2018 |
| JP | 2020-040593 | 3/2020 |
| WO | 2016/098567 | 6/2016 |

* cited by examiner

VEHICLE BODY REAR PART STRUCTURE

CROSS-REFERENCE TO RELATED APPLICATION

Priority is claimed on Japanese Patent Application No. 2021-021043, filed on Feb. 12, 2021, the contents of which are incorporated herein by reference.

BACKGROUND

Field of the Invention

The present invention relates to a vehicle body rear part structure.

Background

As a vehicle body rear part structure, for example, a structure is known in which a first flexure acceleration part, a second flexure acceleration part, and a third flexure acceleration part are provided at three positions, respectively, from a vehicle body frontward direction toward a vehicle body rearward direction in order to bend a rear frame in a valley shape inward in a vehicle width direction. Further, the length between the first flexure acceleration part and the second flexure acceleration part is set to be longer than the length between the second flexure acceleration part and the third flexure acceleration part. Hereinafter, the first flexure acceleration part, the second flexure acceleration part, and the third flexure acceleration part are referred to as a first bead, a second bead, and a third bead.

By the rear frame, for example, the second bead is bent inward in the vehicle width direction with the first bead as a fulcrum by an impact load that is input at the time of a rear surface collision, and an impact energy is absorbed (for example, refer to Japanese Patent No. 6098622).

SUMMARY

The rear frame of Japanese Patent No. 6098622 bends the second bead inward in the vehicle width direction and absorbs the impact energy, and it is not possible to crush the rear frame in a vehicle body front-to-rear direction (axis direction) by an impact load. Therefore, it is difficult to sufficiently absorb the impact energy when an impact load is input to the rear frame.

An object of an aspect of the present invention is to provide a vehicle body rear part structure that can crush a rear frame in a vehicle body front-to-rear direction and increase an impact absorption energy.

A vehicle body rear part structure according to a first aspect of the present invention includes: a rear frame that is provided on an outside in a vehicle width direction at a vehicle body rearward position and extends in a vehicle body front-to-rear direction; and a beam member that is joined to a rear end part of the rear frame and protrudes in an arch shape toward a vehicle body rearward direction, wherein the rear frame has: a pair of first fragile parts formed as a pair on an inner wall at an inside in the vehicle width direction and an outer wall at an outside in the vehicle width direction in a region closest to the beam member; and a pair of second fragile parts formed on the inner wall and the outer wall in a region that is separated by a predetermined distance to a vehicle body frontward direction from the first fragile part, and the pair of first fragile parts are formed such that a first fragile part of the outer wall has a higher fragility than a first fragile part of the inner wall.

According to this configuration, the beam member having an arch shape is joined to the rear end part of the rear frame. The pair of first fragile parts and the pair of second fragile parts are formed on the rear frame. An impact load is input to the beam member due to a rear surface collision. By an impact load being input to the beam member, the beam member extends outward in the vehicle width direction and is deformed in a linear shape by the input impact load.

The beam member is deformed in a linear shape outward in the vehicle width direction, and thereby, an outward load is generated that pushes the rear end part of the rear frame outward in the vehicle width direction.

Here, in the pair of first fragile parts, the first fragile part of the outer wall is formed to have a higher fragility (deformability) than the first fragile part of the inner wall. Accordingly, by an outward load being generated at the rear end part of the rear frame, an outward bend moment is generated at a rear part of the rear frame with the pair of first fragile parts (specifically, the first fragile part of the outer wall) as a fulcrum.

Further, the pair of second fragile parts are formed in a region that is separated by a predetermined distance to a vehicle body frontward direction relative to the pair of first fragile parts. Accordingly, an inward bend moment is generated at the rear frame with the pair of second fragile parts as a fulcrum by a reaction force of the outward bend moment. By the inward bend moment, an inward load against the outward load is generated at the rear frame.

Thereby, it is possible to crush the rear frame in the vehicle body front-to-rear direction (a longitudinal direction, an axis direction) and increase an impact absorption energy without bending the rear frame in any of the inside and the outside in the vehicle width direction.

In a second aspect, the rear frame may have: a curved portion formed in a curved shape curved outward in the vehicle width direction toward a vehicle body frontward direction at a front part connected to a side sill provided at a vehicle body frontward position of the rear frame; and a third fragile part that is formed on the inner wall in a region at a vehicle body frontward position of the second fragile part.

According to this configuration, the curved portion is formed on the front part of the rear frame connected to the side sill. Therefore, for example, when an impact load is input to the rear frame due to a rear surface collision, the rear frame tends to bend outward in the vehicle width direction with the curved portion as a fulcrum by the input impact load.

Therefore, the third fragile part is formed on the inner wall in a region of the rear frame at a vehicle body frontward position of the second fragile part. Accordingly, it is possible for the rear frame to easily bend inward in the vehicle width direction from the third fragile part by the input impact load. Thereby, the bend of the rear frame is balanced outward and inward in the vehicle width direction, and even in a later phase of the rear surface collision, it is possible to crush the rear frame in the vehicle body front-to-rear direction and increase an impact absorption energy.

In a third aspect, the rear frame may have a downward bend fragile part that is formed on an outer corner part where the outer wall and a lower surface part intersect with each other in a vicinity of a fixation part that fixes a sub-frame which supports a rear suspension.

According to this configuration, the downward bend fragile part is formed on the rear frame in the vicinity of the fixation part that fixes the sub-frame. Accordingly, for example, when an impact load is input to the rear frame due to a rear surface collision, the rear frame can be bent downward from a downward bend bead by the input impact load. Thereby, it is possible to generate an upward moment with the fragile part of a side sill as a fulcrum. Accordingly, the side sill and the rear frame can be bent in an inverse V shape so as to protrude upward, and it is possible to increase an impact absorption energy.

In a fourth aspect, the rear frame may include a reinforcement member that is provided in an inner part of the rear frame, and the reinforcement member may have a reinforcement fragile part that is formed on a reinforcement outer corner part where a reinforcement outer wall and a reinforcement lower surface part intersect with each other in a region corresponding to the downward bend fragile part.

According to this configuration, the reinforcement member is provided in an inner part of the rear frame, and the reinforcement fragile part is formed in a region of the reinforcement member corresponding to the downward bend fragile part. Accordingly, for example, when an impact load is input to the rear frame due to a rear surface collision, it is possible to bend (deform) the reinforcement member by the input impact load. Thereby, it is possible to absorb an impact energy by the reinforcement member, and it is possible to increase an impact absorption energy.

In a fifth aspect, the rear frame may have: a curved portion formed in a curved shape curved outward in the vehicle width direction toward a vehicle body frontward direction at a front part connected to a side sill provided at a vehicle body frontward position of the rear frame; and a third fragile part that is formed on the inner wall in a region at a vehicle body frontward position of the second fragile part, and a rear end part inclined in a vehicle body frontward direction from the reinforcement outer wall toward a reinforcement inner wall may be formed on the reinforcement member so as to avoid the third fragile part.

According to this configuration, the rear end part of the reinforcement member is inclined so as to avoid the third fragile part. Accordingly, the rear frame can be easily bent inward in the vehicle width direction from the third fragile part by the input impact load. Thereby, the bend of the rear frame is balanced outward and inward in the vehicle width direction, and even in a later phase of the rear surface collision, it is possible to crush the rear frame in the vehicle body front-to-rear direction.

Further, the rear frame can be bent downward from a downward bend bead by the input impact load. Accordingly, it is possible to generate an upward moment with the fragile part of a side sill as a fulcrum. Thereby, the side sill and the rear frame can be bent in an inverse V shape so as to protrude upward.

In this way, by crushing the rear frame in the vehicle body front-to-rear direction and bending the side sill and the rear frame in an inverse V shape so as to protrude upward, it is possible to increase an impact absorption energy.

In a sixth aspect, the vehicle body rear part structure may include: a side panel that extends outward in a width direction from the rear frame and has a first ridge part formed on a front part of the side panel; and a bulkhead that extends outward in the width direction from the rear frame, bridges the rear frame and an outer panel, and has a second ridge part that is located at a vehicle body rearward position relative to the first ridge part, and the fixation part may be arranged between the first ridge part and the second ridge part in a vehicle body front-to-rear direction.

According to this configuration, the first ridge part is formed on the side panel, and the second ridge part is formed on the bulkhead. Further, the fixation part for fixing the sub-frame is arranged between the first ridge part and the second ridge part in the vehicle body front-to-rear direction. Accordingly, a lateral force that is input from the outside in the vehicle width direction can be supported by the first ridge part and the second ridge part. Thereby, it is possible to improve a stiffness against the lateral force that acts on the fixation part.

Here, the bulkhead is commonly formed in a closed cross-sectional structure in order to ensure the stiffness against the lateral force. The cross-sectional structure prevents the weight of the bulkhead from being reduced. Accordingly, the fixation part is arranged between the first ridge part and the second ridge part, and the stiffness against the lateral force is improved. Thereby, the bulkhead can be a structure in a single plane having the second ridge part without having the closed cross-sectional structure, and it is possible to reduce the weight of the bulkhead.

In a seventh aspect, the fixation part may include: a collar member which is provided in an inner part of the rear frame and to which a fastening member that fixes the sub-frame is fastened; and a second bulkhead that is connected to the collar member and is provided in the inner part of the rear frame, and the second bulkhead may be connected to the bulkhead.

According to this configuration, the fixation part is constituted of the collar member and the second bulkhead. Further, the second bulkhead is connected to the bulkhead. Accordingly, a lateral force that is input from the outside in the vehicle width direction can be supported by the second bulkhead and the collar member in addition to the first ridge part and the second ridge part. Thereby, it is possible to further improve the stiffness against the lateral force that acts on the fixation part of the sub-frame.

According to an aspect of the present invention, it is possible to crush the rear frame in the vehicle body front-to-rear direction and increase the impact absorption energy.

DESCRIPTION OF EMBODIMENTS

Figure 1:
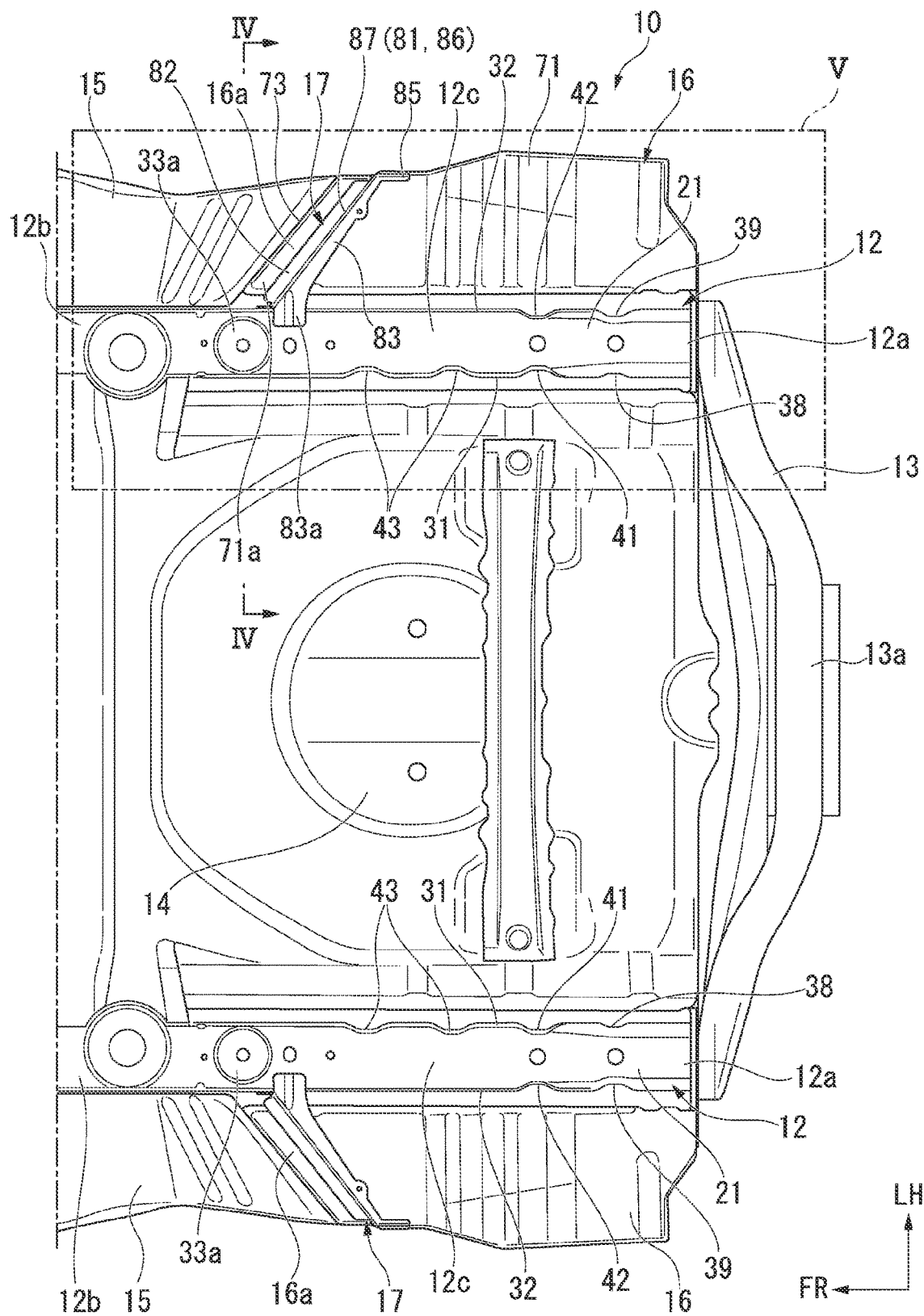
FIG. 1 is a bottom view showing a vehicle body rear part structure according to an embodiment of the present invention.

Hereinafter, a vehicle body rear part structure according to an embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle.

<Vehicle Body Rear Part Structure>

Figure 2:
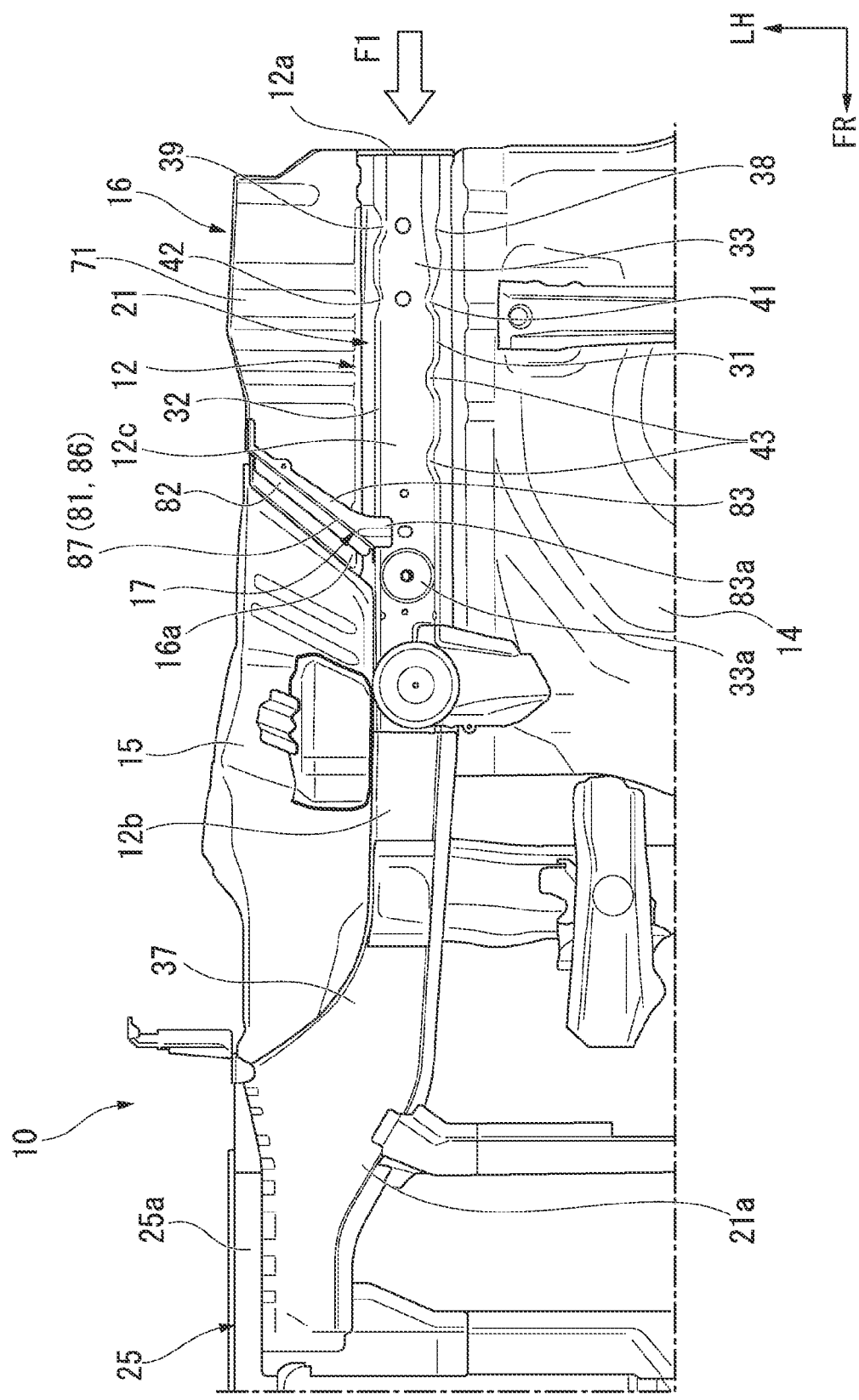
FIG. 2 is a bottom view showing a left side configuration of the vehicle body rear part structure according to the embodiment.

As shown in FIG. 1 and FIG. 2, a vehicle body rear part structure 10 includes, for example, right and left rear frames 12, a beam member 13, a rear floor panel 14, right and left wheel houses 15, right and left side panels 16, and right and left bulkheads 17.

The left rear frame 12 and the right rear frame 12 are provided to be spaced from each other on left and right outer sides in a vehicle width direction, respectively, at a vehicle body rear position and extend in a vehicle body front-to-rear direction. The beam member 13 is joined to a rear end part 12a of the left rear frame 12 and a rear end part 12a of the right rear frame 12 in a state where the beam member 13 bridges the rear end parts 12a. The beam member 13 protrudes in an arch shape such that a middle part 13a protrudes toward a vehicle body rearward direction.

The rear floor panel 14 is interposed between the left rear frame 12 and the right rear frame 12. The left wheel house 15 and the right wheel house 15 are provided on a front half part 12b of the left rear frame 12 and a front half part 12b of the right rear frame 12, respectively, from the outside in the vehicle width direction.

The left side panel 16 and the right side panel 16 are provided on a rear half part 12c of the left rear frame 12 and a rear half part 12c of the right rear frame 12 at a vehicle body rear position of the left wheel house 15 and the right wheel house 15, respectively, from the outside in the vehicle width direction. The left bulkhead 17 and the right bulkhead 17 are provided at a front part 16a of the left side panel 16 and at a front part 16a of the right side panel 16 and on the left rear frame 12 and the right rear frame 12, respectively, from the outside in the vehicle width direction.

Here, the vehicle body rear part structure 10 has a substantially symmetrical configuration in a left-to-right direction. Hereinafter, a configuration member on the left side and a configuration member on the right side are denoted by the same reference numeral, the configuration member on the left side is described, and the explanation of the configuration member on the right side is omitted. The left rear frame 12, the left wheel house 15, the left side panel 16, and the left bulkhead 17 as the configuration members on the left side are abbreviated as a "rear frame 12", a "wheel house 15", a "side panel 16" and, a "bulkhead 17".

<Rear Frame>

Figure 3:
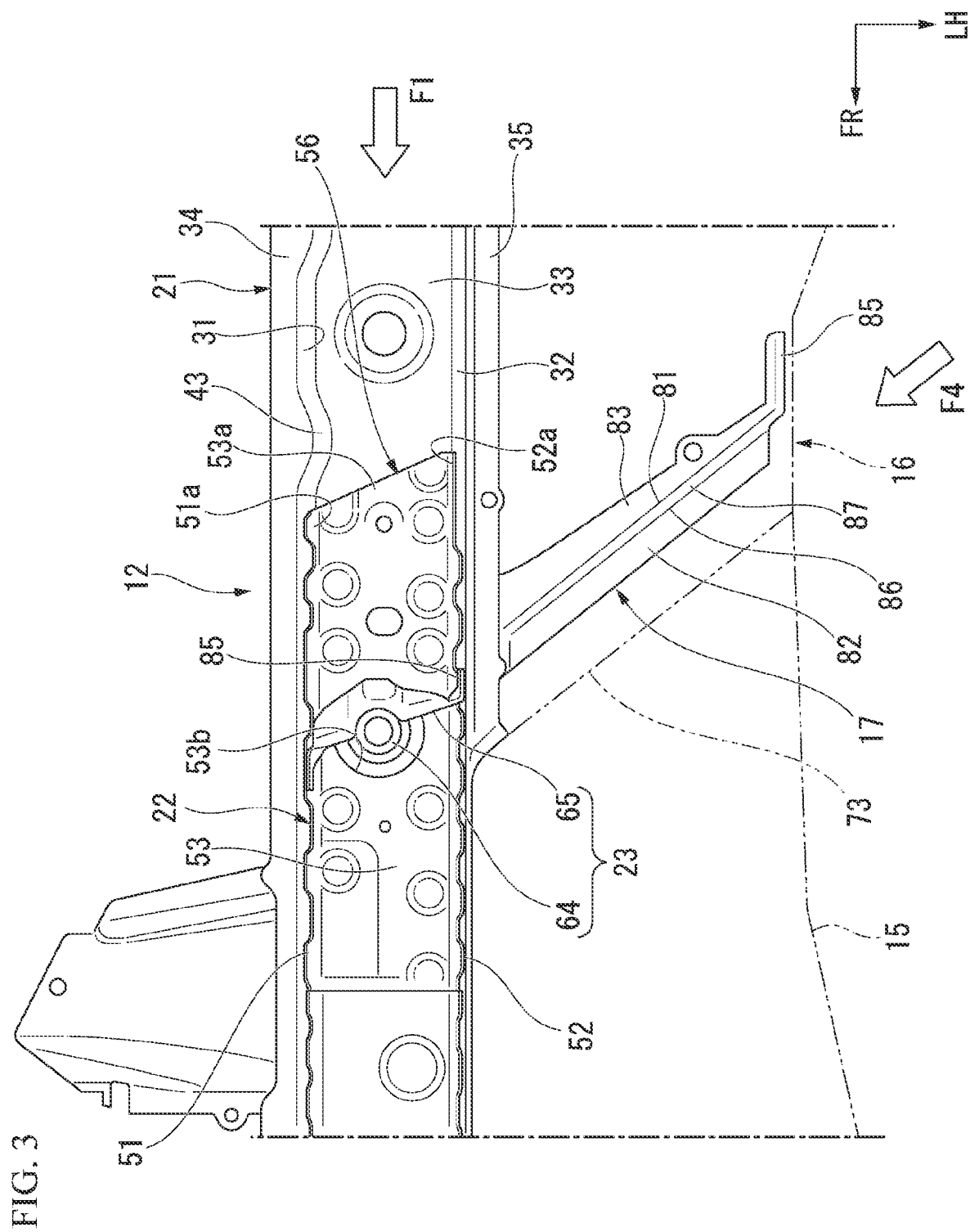
FIG. 3 is a plan view showing a left side configuration of the vehicle body rear part structure according to the embodiment.

As shown in FIG. 2 and FIG. 3, the rear frame 12 includes a rear frame main body 21, a reinforcement member 22, and a rear fixation part (fixation part) 23. The rear frame 12 is a member that has a high stiffness and forms part of a vehicle body frame.

The rear frame main body 21 extends from a rear part 25a of a left side sill 25 (hereinafter, abbreviated as a side sill 25) toward a vehicle body rearward direction. The side sill 25 is provided at a vehicle body frontward position of the rear frame 12 in the middle in a vehicle body front-to-rear direction. The side sill 25 is a member that has a high stiffness, forms part of the vehicle body frame, and extends in a vehicle body front-to-rear direction at a left outer side in the vehicle width direction.

The side sill 25 has a side-sill fragile part 26 (refer to FIG. 12) in a region close to the rear part 25a.

Figure 4:
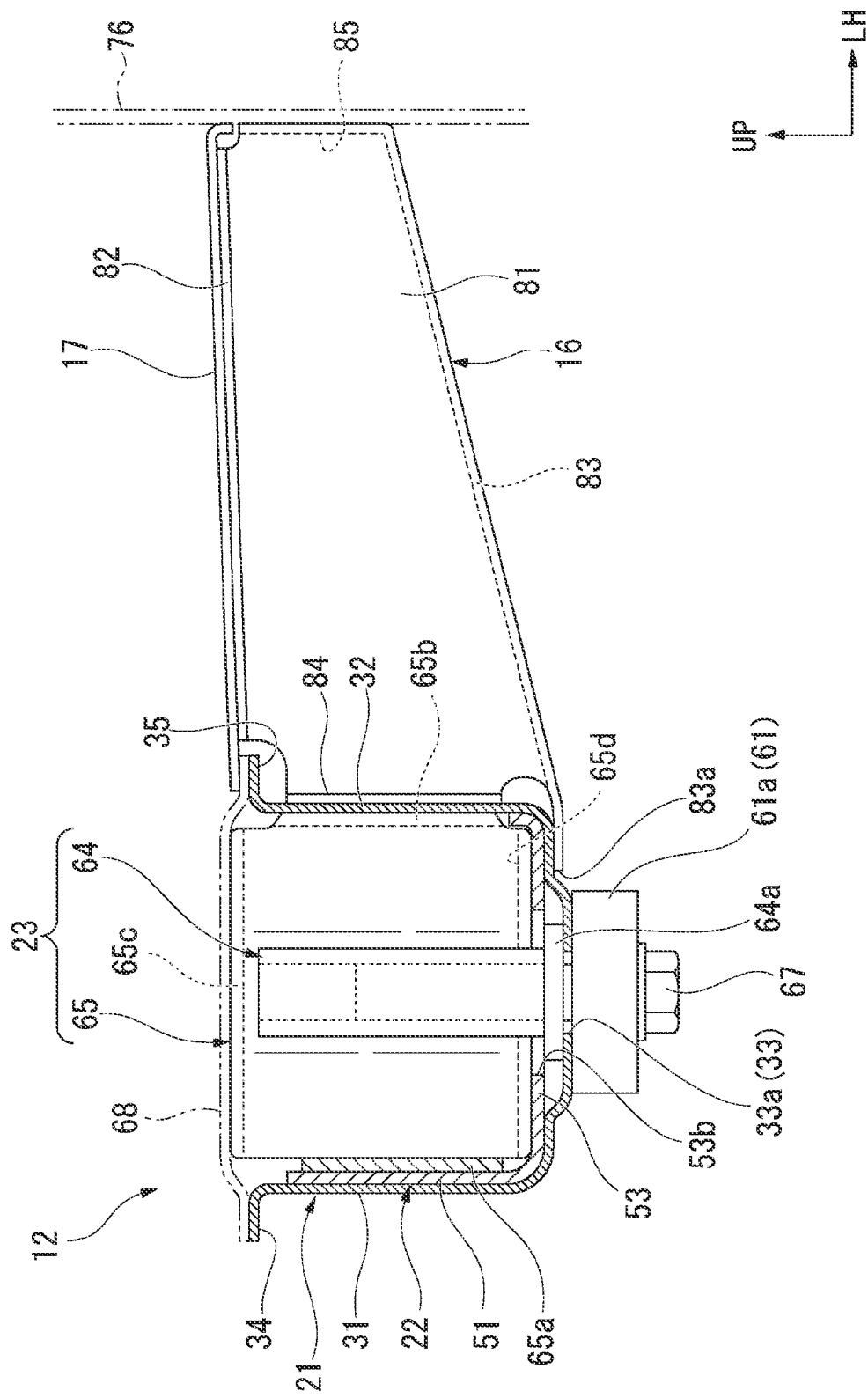
FIG. 4 is a sectional view broken along a IV-IV line of FIG. 1.
Figure 5:
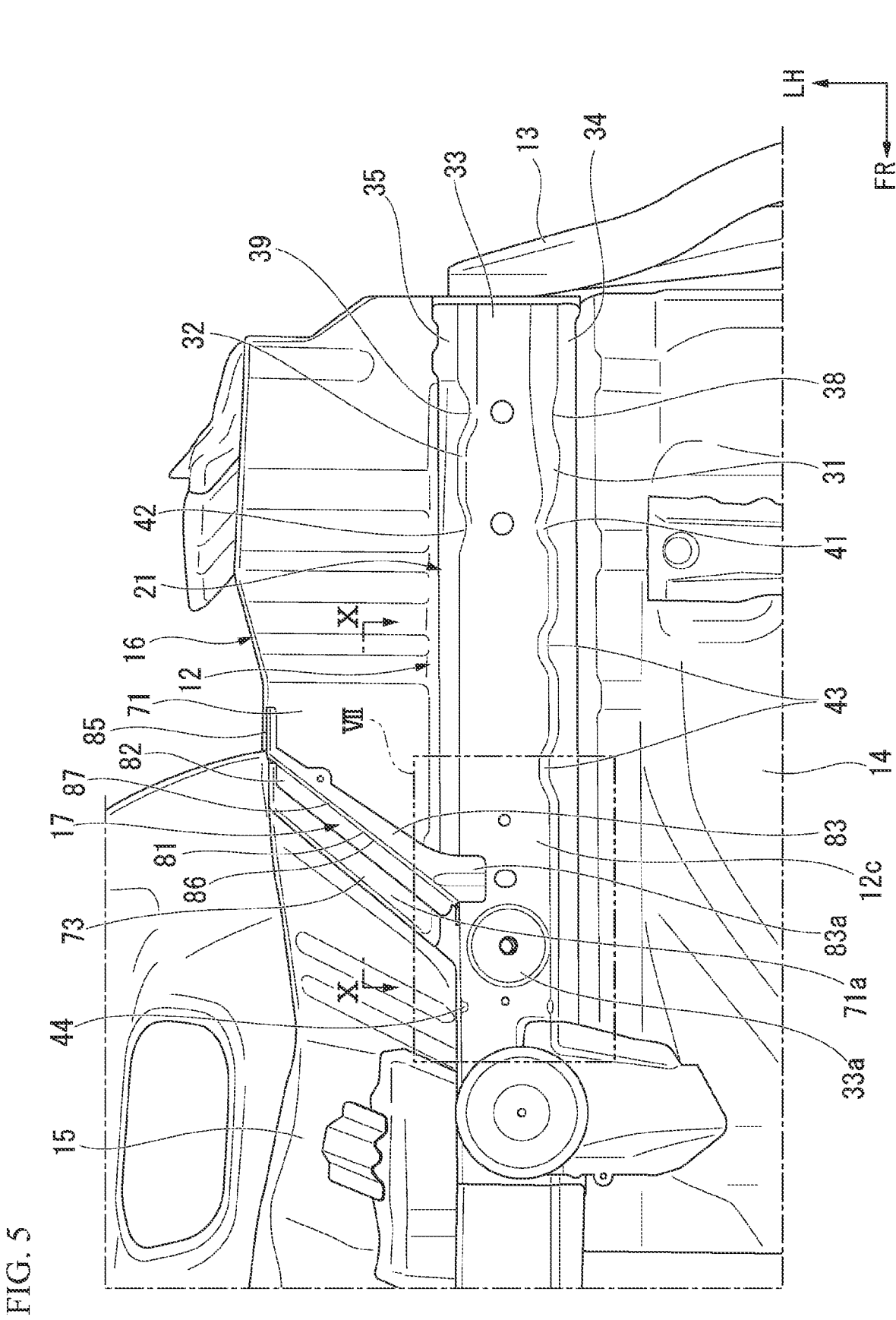
FIG. 5 is an enlarged bottom view of a V part of FIG. 1.

As shown in FIG. 3 to FIG. 5, the rear frame main body 21 is formed of an inner wall (inner surface) 31, an outer wall (outer surface) 32, a lower surface part 33, an inner flange 34, and an outer flange 35 in a hat shape in a cross-section.

The rear frame main body 21 includes a curved portion 37, a pair of first beads (first fragile part) 38 and 39, a pair of second beads (second fragile part) 41 and 42, a third bead (third fragile part) 43, and a downward bend bead (downward bend fragile part) 44.

As shown in FIG. 2, a front part 21a of the rear frame main body 21 is connected to the rear part 25a of the side sill 25, and the curved portion 37 is formed on the front part 21a. The curved portion 37 is formed so as to project in a curved shape outward in the vehicle width direction toward the rear part 25a of the side sill 25.

Figure 6:
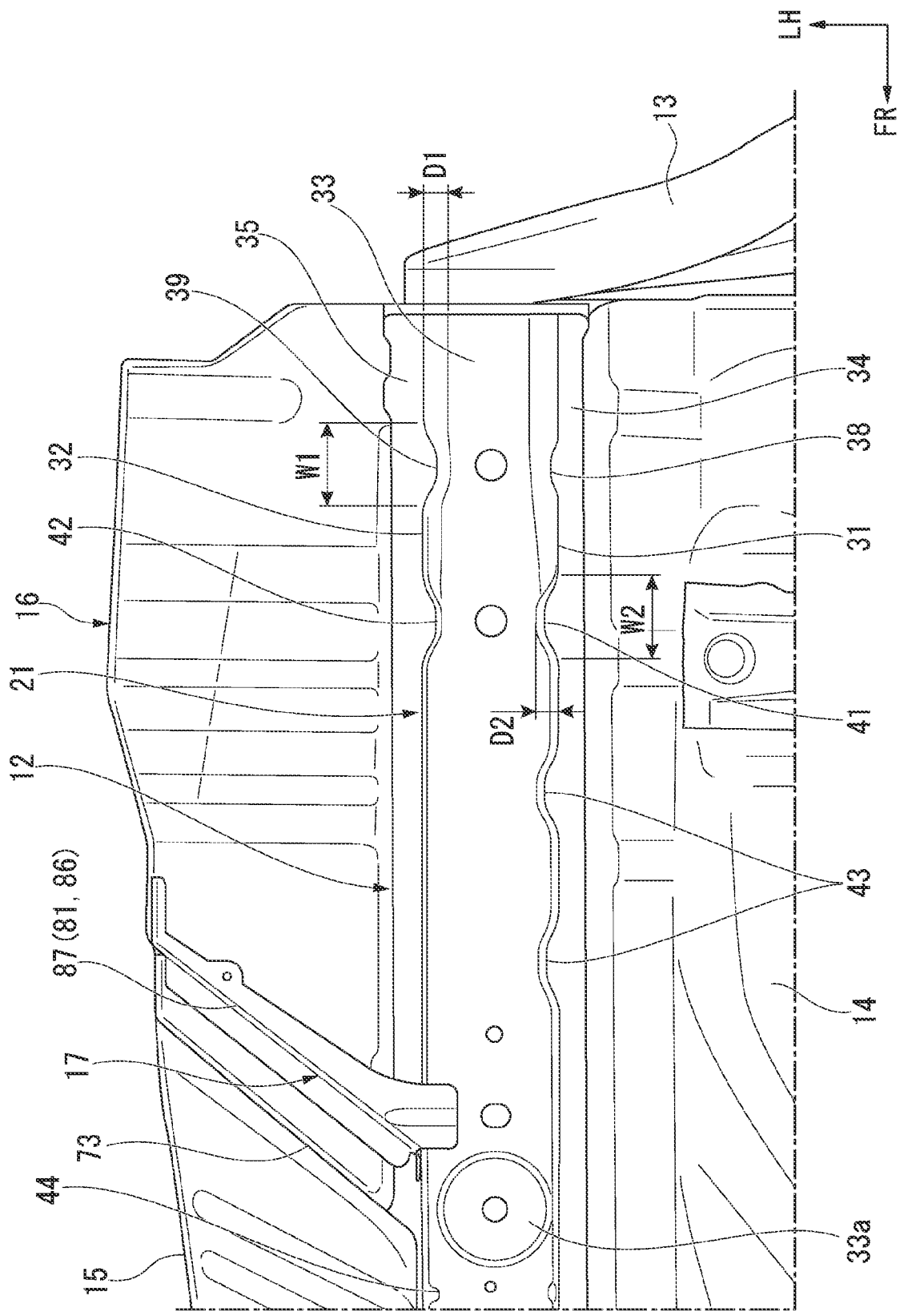
FIG. 6 is a bottom view showing a rear frame of the vehicle body rear part structure according to the embodiment.

As shown in FIG. 5 and FIG. 6, the pair of first beads 38 and 39 are formed on the inner wall 31 on the inside in the vehicle width direction and on the outer wall 32 on the outside in the vehicle width direction, respectively, in a region of the rear frame main body 21 closest to the beam member 13. Hereinafter, the first bead 38 formed on the inner wall 31 may be referred to as a "first inner bead 38", and the first bead 39 formed on the outer wall 32 may be referred to as a "first outer bead 39".

The first inner bead 38 is formed, for example, so as to be recessed toward the outside of the vehicle width direction in the inner wall 31 and extends in the vertical direction from an upper side of the inner wall 31 to a lower side. The first outer bead 39 is formed, for example, so as to be recessed toward the inside of the vehicle width direction in the outer wall 32 and extends in the vertical direction from an upper side of the outer wall 32 to a lower side.

The first outer bead 39 is formed to have a higher fragility (deformability) than the first inner bead 38. Specifically, the first outer bead 39 is formed such that a bead width W1 in the vehicle body front-to-rear direction is larger than that of the first inner bead 38, or a bead depth D1 is larger than that of the first inner bead 38.

The embodiment is described using an example in which the first fragile part is formed of a bead. However, as another example, for example, the first fragile part may be formed by other means such as thinning the thickness or opening an opening part.

The pair of second beads 41 and 42 are formed on the inner wall 31 and the outer wall 32, respectively, in a region of the rear frame main body 21 separated by a predetermined distance to the vehicle body frontward direction from the first inner bead 38 and the first outer bead 39. Hereinafter, the second bead 41 formed on the inner wall 31 may be referred to as a "second inner bead 41", and the second bead 42 formed on the outer wall 32 may be referred to as a "second outer bead 42".

The second inner bead 41 is formed, for example, so as to be recessed toward the outside of the vehicle width direction in the inner wall 31 and extends in the vertical direction from an upper side of the inner wall 31 to a lower side. The second outer bead 42 is formed, for example, so as to be recessed toward the inside of the vehicle width direction in the outer wall 32 and extends in the vertical direction from an upper side of the outer wall 32 to a lower side.

The second inner bead 41 and the second outer bead 42 are formed to have the same fragility (deformability) as each other. Specifically, the second inner bead 41 and the second outer bead 42 are formed in a shape in which a bead width W2 in the vehicle body front-to-rear direction and a bead depth D2 are the same as each other.

The embodiment is described using an example in which the second inner bead 41 and the second outer bead 42 are formed to have the same fragility; however, the embodiment is not limited thereto. As another example, the second inner bead 41 may be formed to have a higher fragility than the second outer bead 42. Specifically, the second inner bead 41 may be formed such that the bead width W2 in the vehicle body front-to-rear direction is larger than that of the second outer bead 42, or the bead depth D2 is larger than that of the second outer bead 42.

The embodiment is described using an example in which the second fragile part is formed of a bead. However, as another example, for example, the second fragile part may be formed by other means such as thinning the thickness or opening an opening part.

A pair of third beads 43 are formed only on the inner wall 31 to be spaced from each other in the vehicle body front-to-rear direction in a region of the rear frame main body 21 at a vehicle body frontward position of the pair of second beads 41 and 42.

The third bead 43 is formed in a fragile part, for example, by being formed so as to be recessed outward in the vehicle width direction and extending in the vertical direction from an upper side of the inner wall 31 to a lower side.

The embodiment is described using an example in which the third fragile part is formed of a bead. However, as another example, for example, the third fragile part may be formed by other means such as thinning the thickness or opening an opening part. In the embodiment, two third beads 43 are shown, but the number of third beads 43 can be appropriately selected.

Figure 7:
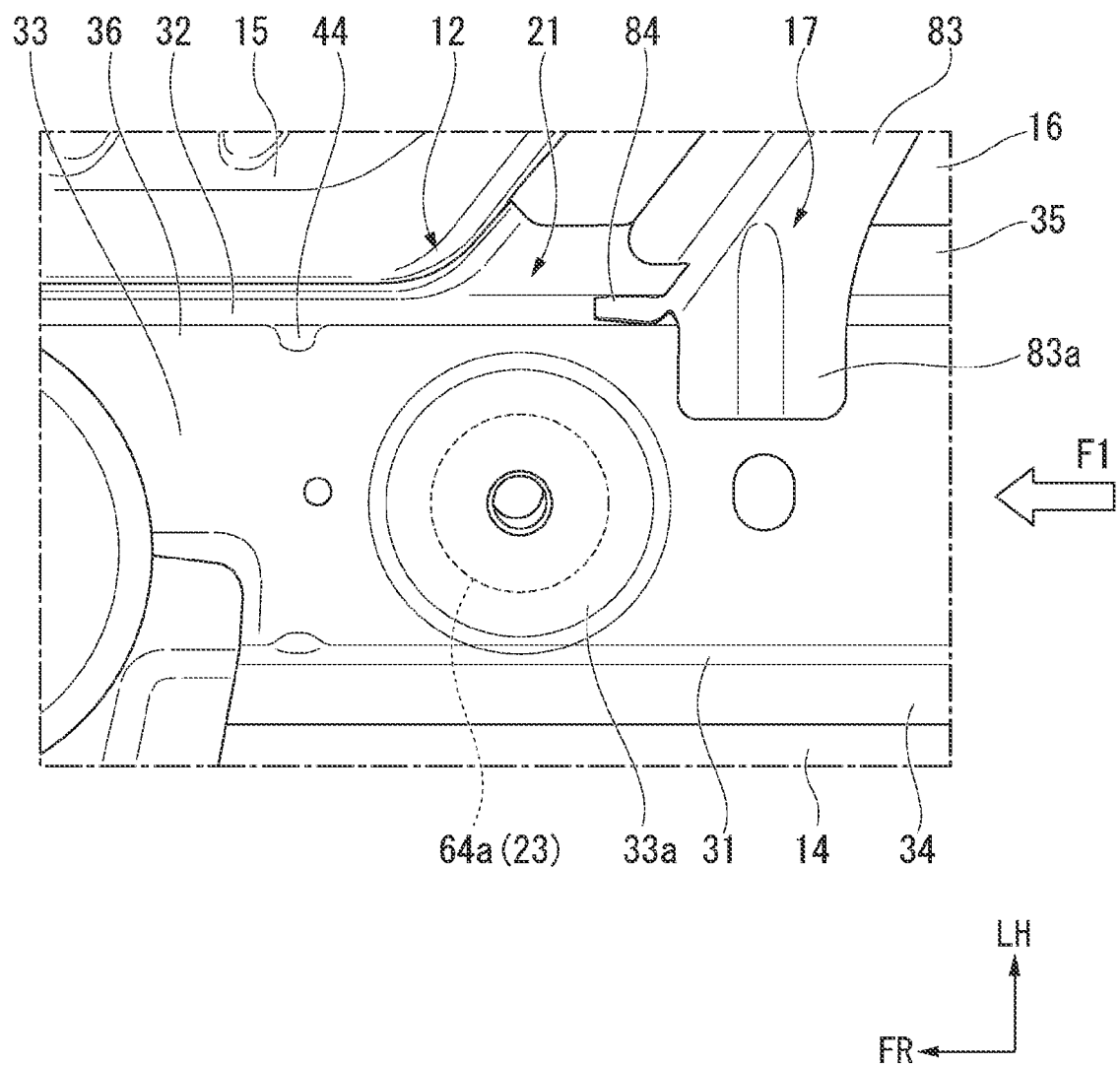
FIG. 7 is an enlarged bottom view of a VII part of FIG. 5.

As shown in FIG. 6 and FIG. 7, the downward bend bead 44 is formed on an outer corner part 36 where the outer wall 32 and the lower surface part 33 intersect with each other in the vicinity of the rear frame main body 21 on the vehicle body frontward side of the rear fixation part 23 (also refer to FIG. 3). The downward bend bead 44 is formed in a fragile part, for example, by being formed so as to be recessed from the outer corner part 36 of the rear frame main body 21 toward the inside of the rear frame main body 21.

The embodiment is described using an example in which the downward bend fragile part is formed of a bead. However, as another example, for example, the downward bend fragile part may be formed by other means such as thinning the thickness or opening an opening part.

As shown in FIG. 3 and FIG. 4, the reinforcement member 22 is provided in an inner part of the rear frame main body 21 formed in a hat shape in a cross-section. The reinforcement member 22 is formed of a reinforcement inner wall (reinforcement inner surface) 51, a reinforcement outer wall (reinforcement outer surface) 52, and a reinforcement lower surface part 53 in a U shape in a cross-section.

The reinforcement inner wall 51 is formed along the inner wall 31 of the rear frame main body 21 and is joined to the inner wall 31. The reinforcement outer wall 52 is formed along the outer wall 32 of the rear frame main body 21 and is joined to the outer wall 32. The reinforcement lower surface part 53 is formed along the lower surface part 33 of the rear frame main body 21 and is joined to the lower surface part 33. The reinforcement member 22 is joined to the inner part of the rear frame main body 21, and thereby, the rear frame main body 21 is reinforced by the reinforcement member 22.

Figure 8:
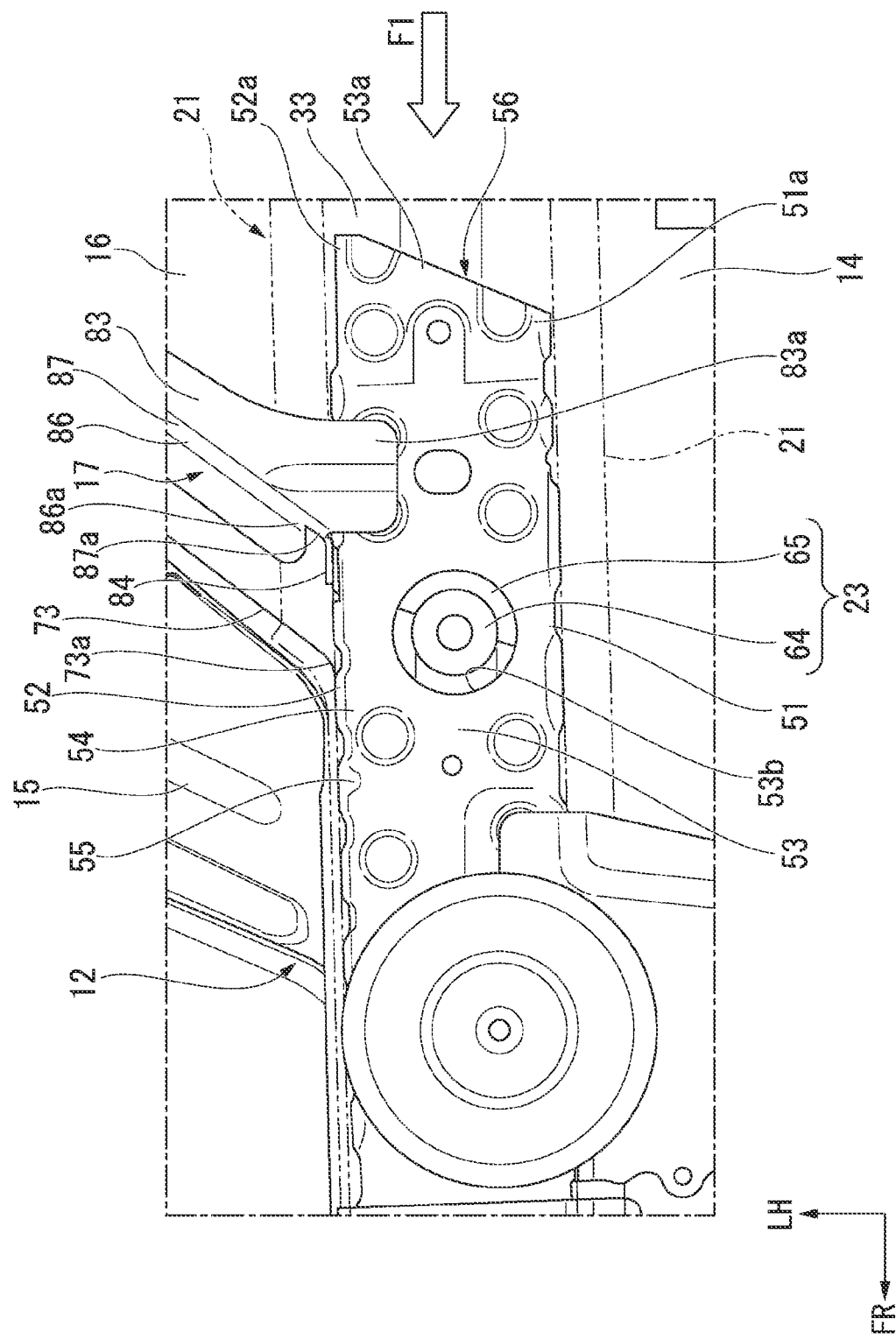
FIG. 8 is a bottom view showing a reinforcement member of the vehicle body rear part structure according to the embodiment.

As shown in FIG. 3 and FIG. 8, the reinforcement member 22 has a reinforcement bead (reinforcement fragile part) 55 and a reinforcement rear end part 56. The reinforcement bead 55 is formed in a region corresponding to the downward bend bead 44 (refer to FIG. 7) of the rear frame main body 21 in a reinforcement outer corner part 54 where the reinforcement outer wall 52 and the reinforcement lower surface part 53 intersect with each other.

The reinforcement bead 55 is formed in a fragile part, for example, by being formed so as to be recessed from the reinforcement outer corner part 54 of the reinforcement member 22 toward the inside of the reinforcement member 22.

The embodiment is described using an example in which the reinforcement fragile part is formed of a bead. However, as another example, for example, the reinforcement fragile part may be formed by other means such as thinning the thickness or opening an opening part.

The reinforcement rear end part 56 of the reinforcement member 22 is formed of a rear end part 51a of the reinforcement inner wall 51, a rear end part 52a of the reinforcement outer wall 52, and a rear end portion 53a of the reinforcement lower surface part 53. The reinforcement rear end part 56 of the reinforcement member 22 is formed such that the rear end portion 53a of the reinforcement lower surface part 53 is inclined in the vehicle body frontward direction from the rear end part 52a of the reinforcement outer wall 52 toward the rear end part 51a of the reinforcement inner wall 51. Thereby, the reinforcement rear end part 56 of the reinforcement member 22 is inclined so as to avoid the third bead 43 (also refer to FIG. 5) of the rear frame main body 21.

Figure 9:
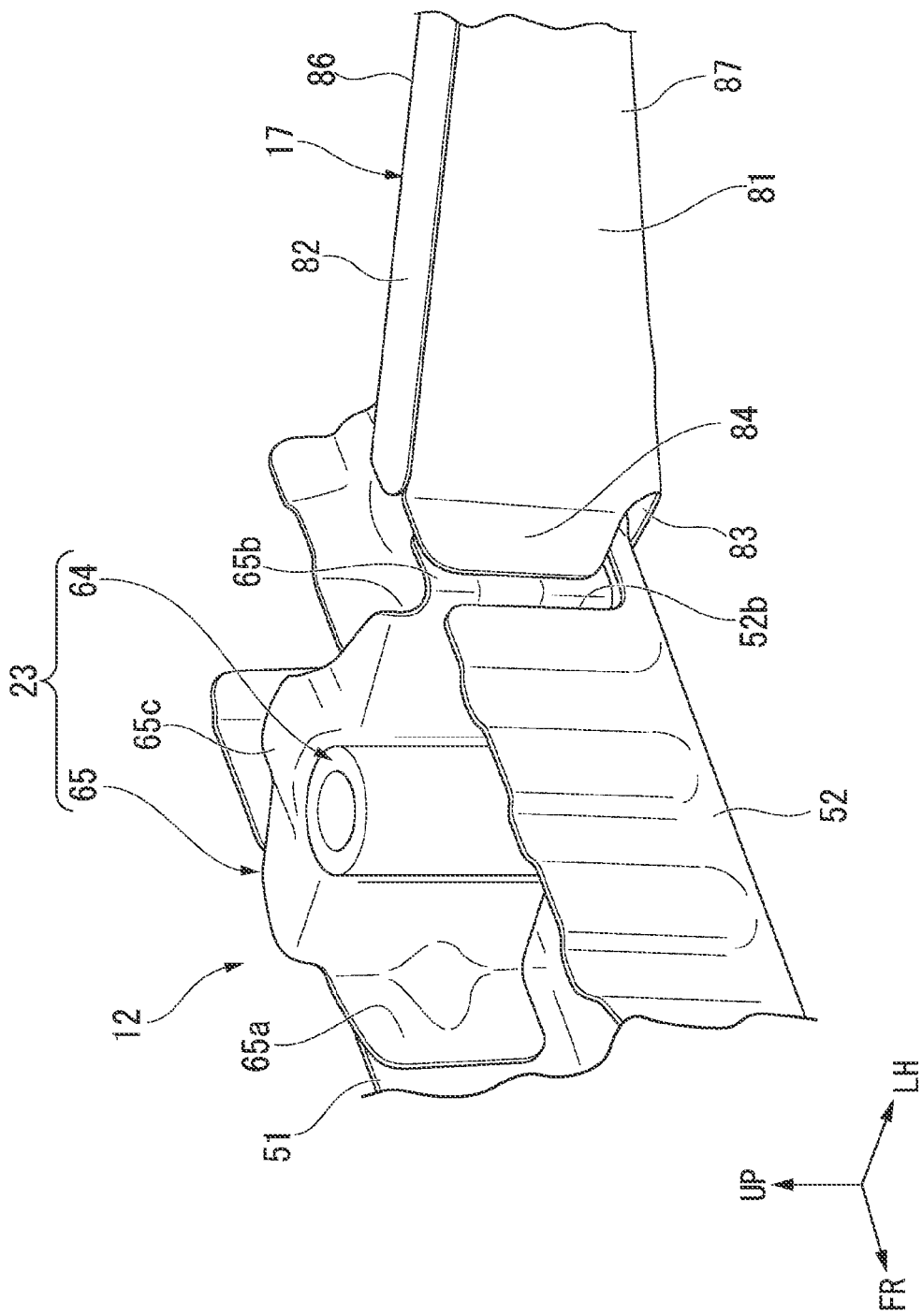
FIG. 9 is a perspective view showing a rear fixation part of the vehicle body rear part structure according to the embodiment.

As shown in FIG. 4 and FIG. 9, the rear fixation part 23 is provided on the rear frame main body 21.

The rear fixation part 23 is arranged in an inner part of the reinforcement member 22. The rear fixation part 23 fixes, for example, a left rear end part 61a of a rear sub-frame (sub-frame) 61. The rear sub-frame 61 is, for example, a frame that supports a rear suspension (not shown). Specifically, the rear fixation part 23 includes a collar nut (collar member) 64 and a reinforcement bulkhead (second bulkhead) 65.

A base part 64a of the collar nut 64 is connected to a fixation portion 33a of the lower surface part 33 of the rear frame main body 21 via an opening portion 53b (also refer to FIG. 8) of the reinforcement lower surface part 53 of the reinforcement member 22. The collar nut 64 is provided in an inner part of the reinforcement member 22 (that is, the rear frame 12). The fixation portion 33a of the rear frame main body 21 is, for example, a portion to which the left rear end part 61a of the rear sub-frame 61 is fixed.

For example, a fastening bolt (fastening member) 67 is fastened to the collar nut 64 from below and is thereby supported by the collar nut 64. Thereby, for example, the left rear end part 61a of the rear sub-frame 61 is fixed to the fixation portion 33a of the rear frame main body 21 by the fastening bolt 67 from below.

The reinforcement bulkhead 65 is arranged in an inner part of the reinforcement member 22 (that is, the rear frame 12) and is provided so as to partition the inner part of the rear frame 12 in a vehicle body front-to-rear direction.

The stiffness of the rear frame 12 is ensured by the reinforcement bulkhead 65. The collar nut 64 is connected to the reinforcement bulkhead 65. The collar nut 64 is rigidly supported by the reinforced bulkhead 65.

The reinforcement bulkhead 65 includes an inner side 65a, an outer side 65b, an upper side 65c, and a lower side 65d. The inner side 65a is connected to the reinforcement inner wall 51. The lower side 65d is connected to the reinforcement lower surface part 53. The upper side 65c is connected to a frame cover 68 of the rear frame 12. The frame cover 68 is connected to an inner flange 34 and an outer flange 35 of the rear frame 12.

The outer side 65b is in contact with the outer wall 32 of the rear frame main body 21 from the inner part of the reinforcement member 22 via an opening part 52b of the reinforcement outer wall 52 and is connected to the outer wall 32 and a bulkhead inward bend side 84 (described later) of the bulkhead 17.

Figure 10:
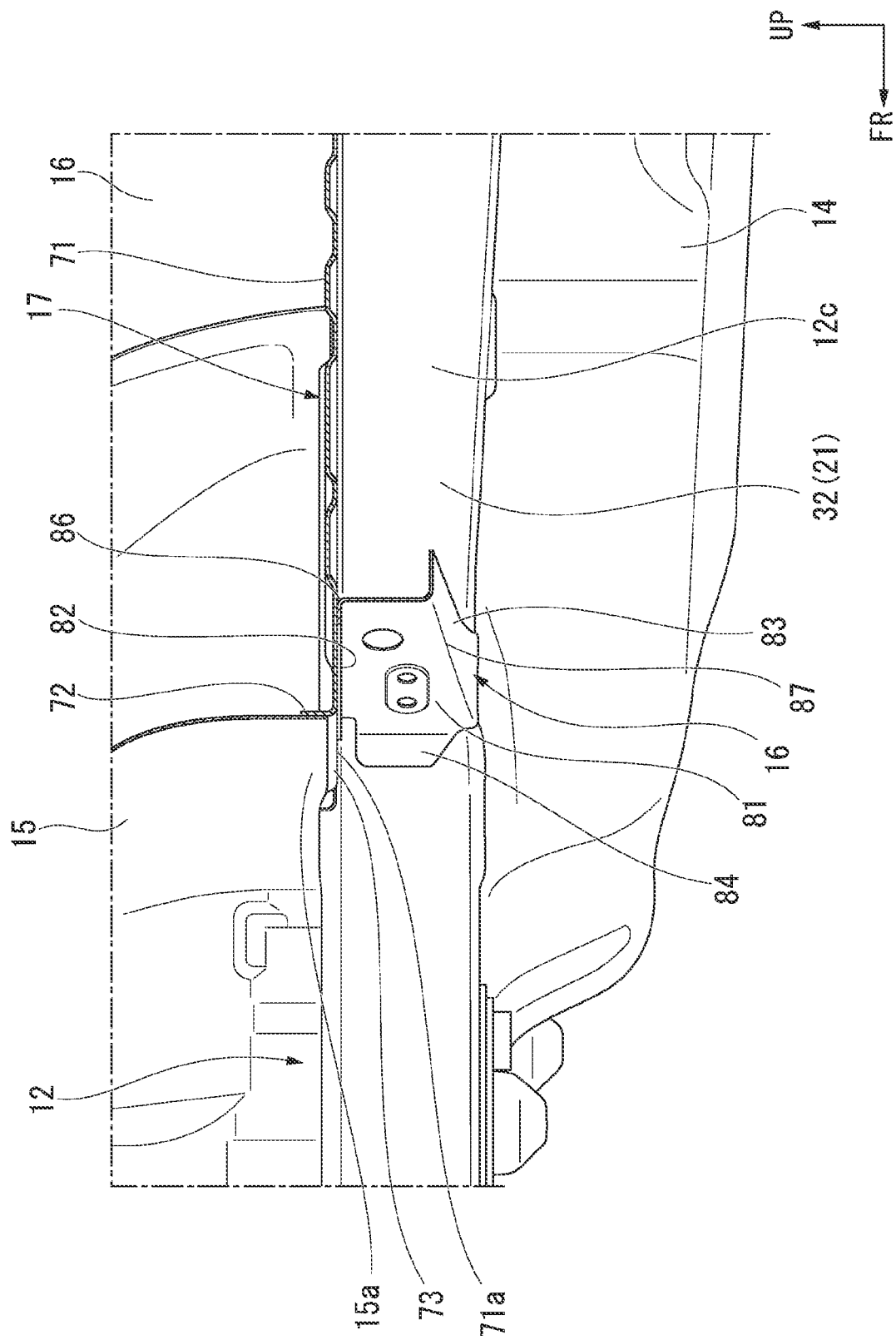
FIG. 10 is a side view partially broken along a X-X line of FIG. 5.

As shown in FIG. 5, FIG. 9, and FIG. 10, the side panel 16 and the bulkhead 17 are connected to the rear frame 12 from the outside in the vehicle width direction.

The side panel 16 includes a side panel main body 71, a frontward bend side 72, and a first ridge part 73. The side panel main body 71 extends from the rear half part 12c of the rear frame 12 outward in the width direction, and a front side 71a extends so as to be inclined in a vehicle body rearward direction from the outer wall 32 of the rear frame main body 21 toward the outside in the vehicle width direction.

The frontward bend side 72 is bent so as to stand upward from the front side 71a.

A rear side 15a of the wheel house 15 is connected to the frontward bend side 72.

The first ridge part 73 is formed at a front part of the side panel 16 by an intersection part between the front side 71a of the side panel main body 71 and the frontward bent side 72. The first ridge part 73 is formed in a ridge line shape at the front portion of the side panel 16 so as to protrude downward and to the vehicle body frontward direction. The first ridge part 73 extends in an inclined manner along the front side 71a to be inclined in the vehicle body rearward direction from the outer wall 32 of the rear frame main body 21 toward the outside in the vehicle width direction.

The bulkhead 17 is arranged below the side panel 16 and at a vehicle body rearward position of the first ridge part 73. The bulkhead 17 projects outward in the width direction from the outer wall 32 of the rear frame main body 21 and thereby bridges the outer wall 32 and an outer panel 76 (refer to FIG. 4). The outer panel 76 is a panel that forms an outer part of the vehicle and thereby decorates the outer surface.

The bulkhead 17 includes a bulkhead longitudinal wall 81, a bulkhead upward bend side 82, a bulkhead downward bend side 83, a bulkhead inward bend side 84, a bulkhead outward bend side 85, a second upper ridge part 86, and a second lower ridge part (second ridge part) 87.

The bulkhead longitudinal wall 81 stands in the vertical direction at a vehicle body rearward position of the first ridge part 73 and extends in an inclined manner along the first ridge part 73 from the outer wall 32 of the rear frame main body 21. The bulkhead upward bend side 82 is bent toward the vehicle body frontward direction from an upper side of the bulkhead longitudinal wall 81. The bulkhead upward bend side 82 is connected to the side panel main body 71 from below.

The bulkhead downward bend side 83 is bent toward the vehicle body rearward direction from a lower side of the bulkhead longitudinal wall 81. A base end part 83a of the bulkhead downward bend side 83 is connected to the lower surface part 33 of the rear frame main body 21 and the reinforcement lower surface part 53 (refer to FIG. 7 and FIG. 8) of the reinforcement member 22. The bulkhead inward bend side 84 is bent toward the vehicle body frontward direction from an inner side of the bulkhead longitudinal wall 81. The bulkhead inward bend side 84 is connected to the outer wall 32 of the rear frame main body 21 and the outer side 65b (also refer to FIG. 4) of the reinforcement bulkhead 65. The bulkhead outward bend side 85 is bent toward the vehicle body rearward direction from an outer side of the bulkhead longitudinal wall 81. The bulkhead outward bend side 85 is connected to the outer panel 76 (refer to FIG. 4).

The second upper ridge part 86 is formed at an upper part of the bulkhead 17 by an intersection part between the bulkhead longitudinal wall 81 and the bulkhead upward bend side 82. The second upper ridge part 86 is located at a vehicle body rearward position of the first ridge part 73 and extends in an inclined manner along the first ridge part 73.

The second lower ridge part 87 is formed at a lower part of the bulkhead 17 by an intersection part between the bulkhead longitudinal wall 81 and the bulkhead downward bend side 83. The second lower ridge part 87 is arranged below the second upper ridge part 86 and at a vehicle body rearward position of the first ridge part 73 and extends in an inclined manner along the first ridge part 73 and the second upper ridge part 86.

As shown in FIG. 3 and FIG. 8, the rear fixation part 23 (specifically, the collar nut 64) is arranged between a base end portion 73a of the first ridge part 73 and a base end portion 86a of the second upper ridge part 86 in the vehicle body front-to-rear direction. Further, the rear fixation part 23 (specifically, the collar nut 64) is arranged between a base end portion 73a of the first ridge part 73 and a base end portion 87a of the second lower ridge part 87 in the vehicle body front-to-rear direction.

Figure 11:
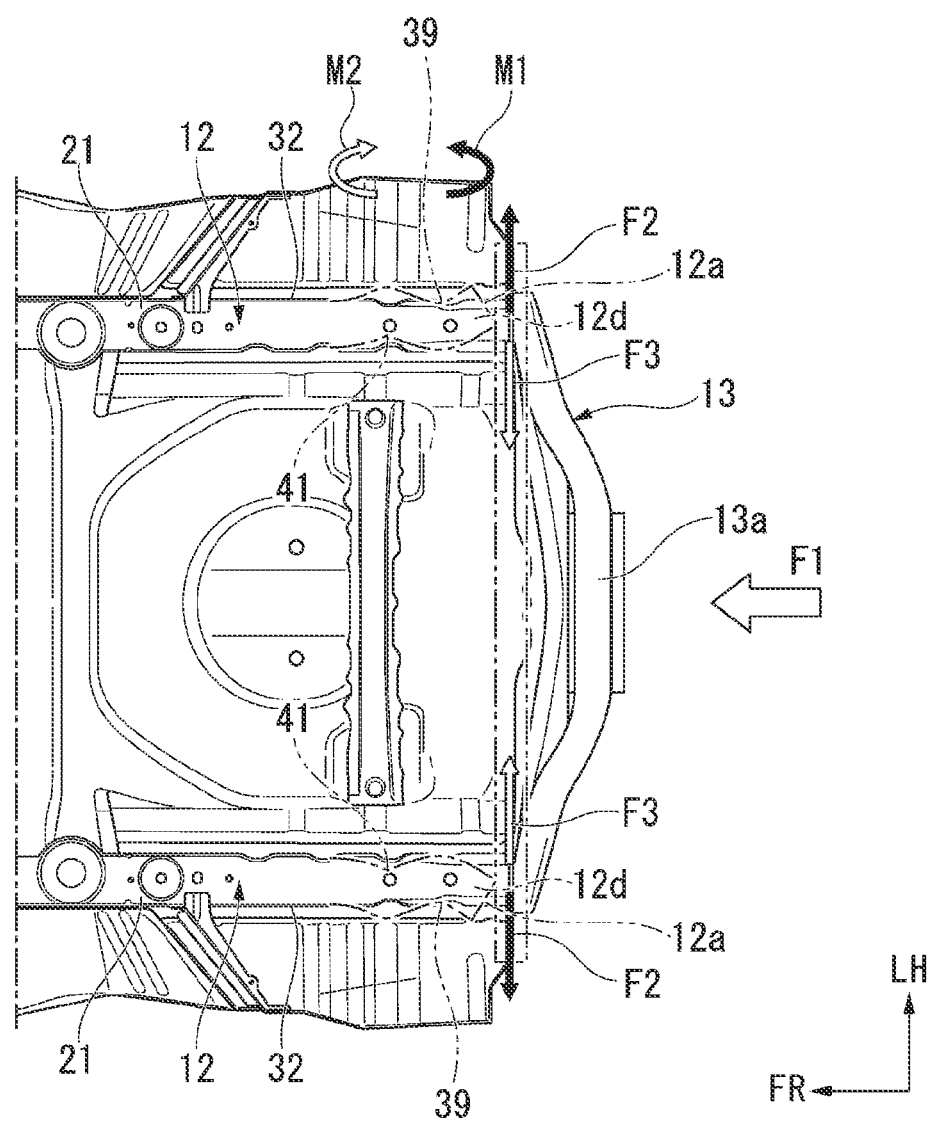
FIG. 11 is a bottom view showing an example in which a rear frame of the vehicle body rear part structure according to the embodiment is crushed in a vehicle body front-to-rear direction.

As described above, according to the vehicle body rear part structure 10 of the embodiment, as shown in FIG. 1 and FIG. 11, the beam member 13 having an arch shape is joined to the rear end part 12a of the left rear frame 12 and the rear end part 12a of the right rear frame 12. The pair of first beads 38 and 39 (that is, the first inner bead 38 and the first outer bead 39) and the pair of second beads 41 and 42 (that is, the second inner bead 41 and the second outer bead 42) are formed on the left rear frame 12. Similarly, the pair of first beads 38 and 39 (that is, the first inner bead 38 and the first outer bead 39) and the pair of second beads 41 and 42 (that is, the second inner bead 41 and the second outer bead 42) are formed on the right rear frame 12.

In this state, an impact load F1 is input to the beam member 13 from the vehicle body rearward direction, for example, due to a rear surface collision. In the beam member 13, the middle part 13a protrudes in an arch shape toward the vehicle body rearward direction. Accordingly, by the impact load F1 being input to the middle part 13a of the beam member 13, the beam member 13 extends outward in the vehicle width direction and is deformed in a linear shape by the input impact load F1. The beam member 13 is deformed in a linear shape, and thereby, an outward load F2 is generated that pushes rear end parts 12a of the left rear frame 12 and the right rear frame 12 outward in the vehicle width direction.

Here, in the pair of first beads 38 and 39, the first outer bead 39 of the outer wall 32 is formed to have a higher fragility than the first inner bead 38 of the inner wall 31.

Accordingly, by the outward load F2 being generated at the rear end part 12a of the right and left rear frames 12, an outward bend moment M1 is generated at a rear part 12d of the right and left rear frames 12 with the pair of first beads 38 and 39 (specifically, the first outer bead 39 of the outer wall 32) as a fulcrum.

Further, the pair of second beads 41 and 42 are formed in a region that is separated by a predetermined distance to the vehicle body frontward direction relative to the pair of first beads 38 and 39. Accordingly, an inward bend moment M2 is generated at the right and left rear frames 12 with the pair of second beads 41 and 42 (specifically, the second inner bead 41) as a fulcrum by a reaction force of the outward bend moment M1. By the inward bend moment M2, an inward load F3 against the outward load F2 is generated at the right and left rear frames 12.

Thereby, it is possible to crush the left rear frame 12 and the right rear frame 12 in the vehicle body front-to-rear direction (the longitudinal direction, the axis direction) and increase an impact absorption energy without bending the left rear frame 12 and the right rear frame in any of the inside and the outside in the vehicle width direction.

Further, as shown in FIG. 2, the curved portion 37 is formed on the front part 21a of the rear frame 12 connected to the side sill 25. Therefore, for example, when an impact load F1 is input from the vehicle body rearward direction to the rear frame 12 due to a rear surface collision, the rear frame 12 tends to bend outward in the vehicle width direction with the curved portion 37 as a fulcrum by the input impact load F1.

Therefore, the pair of third beads 43 are formed on only the inner wall 31 in regions of the rear frame 12 at a vehicle body frontward position of the pair of second beads 41 and 42. Accordingly, the rear frame 12 is formed to easily bend inward in the vehicle width direction from the third bead 43 by the input impact load F1. Thereby, the bend of the rear frame 12 is balanced outward and inward in the vehicle width direction, and even in a later phase of the rear surface collision, it is possible to crush the rear frame 12 in the vehicle body front-to-rear direction and increase an impact absorption energy.

Figure 12:
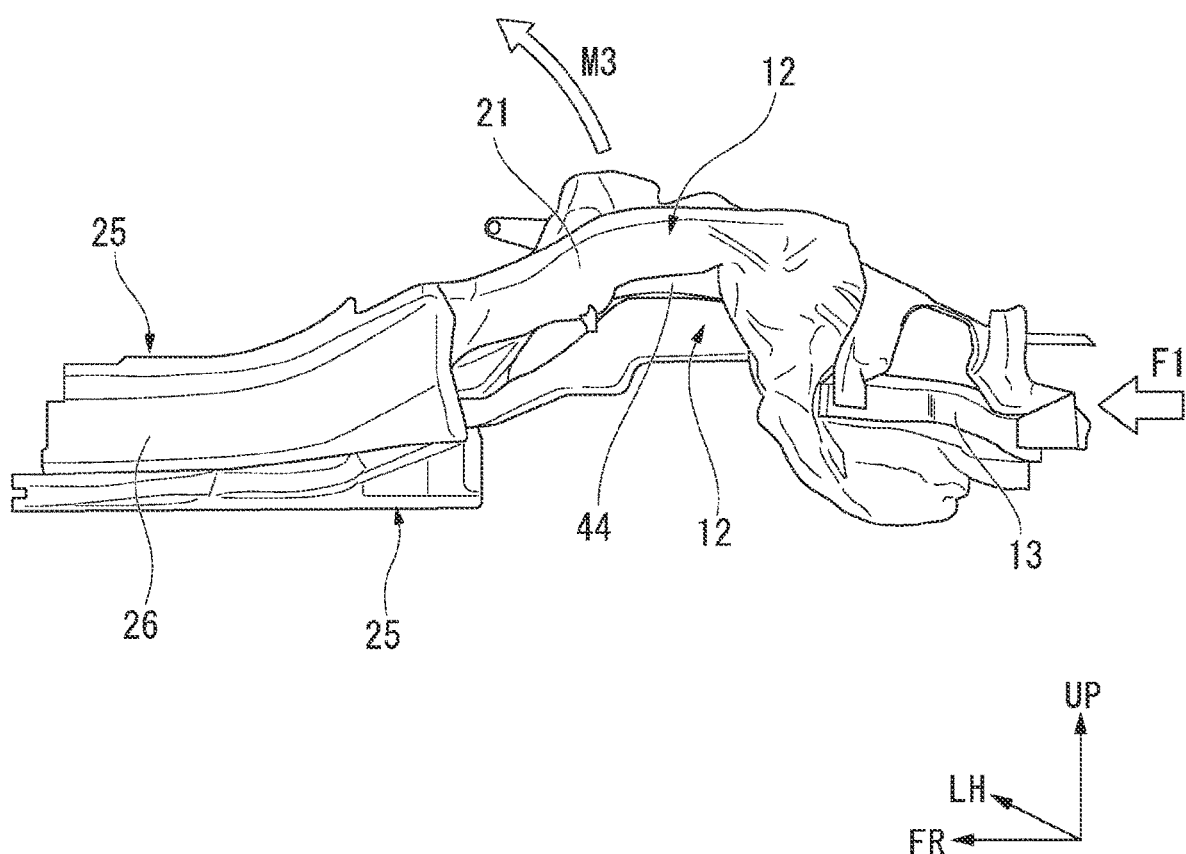
FIG. 12 is a side view showing an example in which the rear frame of the vehicle body rear part structure according to the embodiment is bent in an inverse V shape together with a side sill.

Further, as shown in FIG. 7 and FIG. 12, the downward bend bead 44 is formed on the rear frame 12 in the vicinity of the rear fixation part 23 (specifically, the fixation part 33a) of the sub-frame. Accordingly, for example, when an impact load F1 is input to the rear frame 12 from the vehicle body rearward direction due to a rear surface collision, the rear frame 12 can be bent downward from the downward bend bead 44 by the input impact load F1. Thereby, it is possible to generate an upward moment M3 with the side-sill fragile part 26 of the side sill 25 as a fulcrum. Accordingly, the side sill 25 and the rear frame 12 can be bent in an inverse V shape so as to protrude upward, and it is possible to increase an impact absorption energy.

Additionally, as shown in FIG. 8 and FIG. 12, the reinforcement member 22 is provided in an inner part of the rear frame 12, and the reinforcement bead 55 is formed in a region of the reinforcement member 22 corresponding to the downward bend bead 44. Accordingly, for example, when an impact load F1 is input to the rear frame 12 from the vehicle body rearward direction due to a rear surface collision, it is possible to bend (deform) the reinforcement member 22 by the input impact load F1. Thereby, it is possible to absorb an impact energy by the reinforcement member 22, and it is possible to increase an impact absorption energy.

Further, as shown in FIG. 3, the reinforcement rear end part 56 of the reinforcement member 22 is inclined so as to avoid the third bead 43. Accordingly, the rear frame 12 can be easily bent inward in the vehicle width direction from the third bead 43 by the impact load F1 that is input from the vehicle body rearward direction. Thereby, the bend of the rear frame 12 is balanced outward and inward in the vehicle width direction, and even in a later phase of the rear surface collision, it is possible to crush the rear frame 12 in the vehicle body front-to-rear direction.

Further, as shown in FIG. 12, even in a later phase of the rear surface collision, by crushing the rear frame 12 in the vehicle body front-to-rear direction, the rear frame 12 can be bent downward from the downward bend bead 44 (refer to FIG. 7) by the input impact load F1. Accordingly, it is possible to generate an upward moment M3 with the side-sill fragile part 26 of the side sill 25 as a fulcrum. Thereby, the side sill 25 and the rear frame 12 can be bent in an inverse V shape so as to protrude upward.

In this way, by crushing the rear frame 12 in the vehicle body front-to-rear direction and bending the side sill 25 and the rear frame 12 in an inverse V shape so as to protrude upward, it is possible to increase an impact absorption energy.

Further, as shown in FIG. 3 and FIG. 5, the first ridge part 73 is formed on the side panel 16, and the second lower ridge part 87 is formed on the bulkhead 17. Further, the rear fixation part 23 for fixing the rear sub-frame 61 (specifically, the left rear end part 61a) (refer to FIG. 4) is arranged between the first ridge part 73 and the second lower ridge part 87 in the vehicle body front-to-rear direction. Accordingly, a lateral force F4 that is input from the outside in the vehicle width direction can be supported by the first ridge part 73 and the second lower ridge part 87.

Thereby, it is possible to improve a stiffness against the lateral force F4 that acts on the rear fixation part 23.

Further, the second upper ridge part 86 is formed on the bulkhead 17. Additionally, the rear fixation part 23 is arranged between the first ridge part 73 and the second upper ridge part 86 in the vehicle body front-to-rear direction. Accordingly, the lateral force F4 that is input from the outside in the vehicle width direction can be also supported by the second upper ridge part 86. Thereby, it is possible to further improve the stiffness against the lateral force F4 that acts on the rear fixation part 23.

Here, the bulkhead 17 is commonly formed in a closed cross-sectional structure in order to ensure the stiffness against the lateral force F4. The cross-sectional structure prevents the weight of the bulkhead 17 from being reduced. Accordingly, specifically, the rear fixation part 23 is arranged between the first ridge part 73 and the second lower ridge part 87, and the stiffness against the lateral force F4 is improved. Thereby, the bulkhead 17 can be specifically a structure in a single plane having the second lower ridge part 87 without having the closed cross-sectional structure, and it is possible to reduce the weight of the bulkhead 17.

In the embodiment, the bulkhead 17 can be a structure in a single plane having the second upper ridge part 86 and the second lower ridge part 87, and it is possible to reduce the weight of the bulkhead 17.

Additionally, as shown in FIG. 3, FIG. 4, and FIG. 9, the rear fixation part 23 is constituted of the collar nut 64 and the reinforcement bulkhead 65. Further, the bulkhead outward bend side 85 of the reinforcement bulkhead 65 is connected to the bulkhead inward bend side 84 of the bulkhead 17 via the outer wall 32 of the rear frame main body 21. Accordingly, the lateral force F4 (refer to FIG. 3) that is input from the outside in the vehicle width direction can be supported by the reinforcement bulkhead 65 and the collar nut 64 in addition to the first ridge part 73, the second upper ridge part 86, and the second lower ridge part 87. Thereby, it is possible to further improve the stiffness against the lateral force F4 that acts on the rear fixation part 23.

The technical scope of the present invention is not limited to the embodiments described above, and various modifications can be made without departing from the scope of the present invention.

Alternatively, a component in the embodiments can be replaced with a known component without departing from the scope of the present invention, and modification examples may be suitably combined.

What is claimed is:

1. A vehicle body rear part structure, comprising:
a rear frame that is provided on an outside in a vehicle width direction at a vehicle body rearward position and extends in a vehicle body front-to-rear direction; and
a beam member that is joined to a rear end part of the rear frame and protrudes in an arch shape toward a vehicle body rearward direction,
wherein the rear frame has:
a pair of first fragile parts formed as a pair on an inner wall at an inside in the vehicle width direction and an outer wall at an outside in the vehicle width direction in a region closest to the beam member; and
a pair of second fragile parts formed on the inner wall and the outer wall in a region that is separated by a predetermined distance to a vehicle body frontward direction from the first fragile part, and
the pair of first fragile parts are formed such that a first fragile part of the outer wall has a higher fragility than a first fragile part of the inner wall,
wherein the rear frame has:
a curved portion formed in a curved shape curved outward in the vehicle width direction toward a vehicle body frontward direction at a front part connected to a side sill provided at a vehicle body frontward position of the rear frame.

2. The vehicle body rear part structure according to claim 1,
wherein the rear frame has:
a third fragile part that is formed on the inner wall in a region at a vehicle body frontward position of the second fragile part.

3. The vehicle body rear part structure according to claim 1,
wherein the rear frame has a downward bend fragile part that is formed on an outer corner part where the outer wall and a lower surface part intersect with each other in a vicinity of a fixation part that fixes a sub-frame which supports a rear suspension.

4. The vehicle body rear part structure according to claim 3,
wherein the rear frame comprises a reinforcement member that is provided in an inner part of the rear frame, and
the reinforcement member has a reinforcement fragile part that is formed on a reinforcement outer corner part where a reinforcement outer wall and a reinforcement lower surface part intersect with each other in a region corresponding to the downward bend fragile part.

5. The vehicle body rear part structure according to claim 4,
wherein the rear frame has:
a curved portion formed in a curved shape curved outward in the vehicle width direction toward a vehicle body frontward direction at a front part connected to a side sill provided at a vehicle body frontward position of the rear frame; and
a third fragile part that is formed on the inner wall in a region at a vehicle body frontward position of the second fragile part, and
a rear end part inclined in a vehicle body frontward direction from the reinforcement outer wall toward a reinforcement inner wall is formed on the reinforcement member so as to avoid the third fragile part.

6. The vehicle body rear part structure according to claim 3, comprising:
a side panel that extends outward in a width direction from the rear frame and has a first ridge part formed on a front part of the side panel; and
a bulkhead that extends outward in the width direction from the rear frame, bridges the rear frame and an outer panel, and has a second ridge part that is located at a vehicle body rearward position relative to the first ridge part,
wherein the fixation part is arranged between the first ridge part and the second ridge part in a vehicle body front-to-rear direction.

7. The vehicle body rear part structure according to claim 6,
wherein the fixation part comprises:
a collar member which is provided in an inner part of the rear frame and to which a fastening member that fixes the sub-frame is fastened; and
a second bulkhead that is connected to the collar member and is provided in the inner part of the rear frame, and
the second bulkhead is connected to the bulkhead.

8. A vehicle body rear part structure, comprising:
a rear frame that is provided on an outside in a vehicle width direction at a vehicle body rearward position and extends in a vehicle body front-to-rear direction; and
a beam member that is joined to a rear end part of the rear frame and protrudes in an arch shape toward a vehicle body rearward direction,
wherein the rear frame has:
a pair of first fragile parts formed as a pair on an inner wall at an inside in the vehicle width direction and an outer wall at an outside in the vehicle width direction in a region closest to the beam member; and
a pair of second fragile parts formed on the inner wall and the outer wall in a region that is separated by a predetermined distance to a vehicle body frontward direction from the first fragile part, and
the pair of first fragile parts are formed such that a first fragile part of the outer wall has a higher fragility than a first fragile part of the inner wall,
wherein the rear frame has a downward bend fragile part that is formed on an outer corner part where the outer wall and a lower surface part intersect with each other in a vicinity of a fixation part that fixes a sub-frame which supports a rear suspension.

9. The vehicle body rear part structure according to claim 8,
wherein the rear frame has:
a third fragile part that is formed on the inner wall in a region at a vehicle body frontward position of the second fragile part.

* * * * *